UNITED STATES PATENT OFFICE.

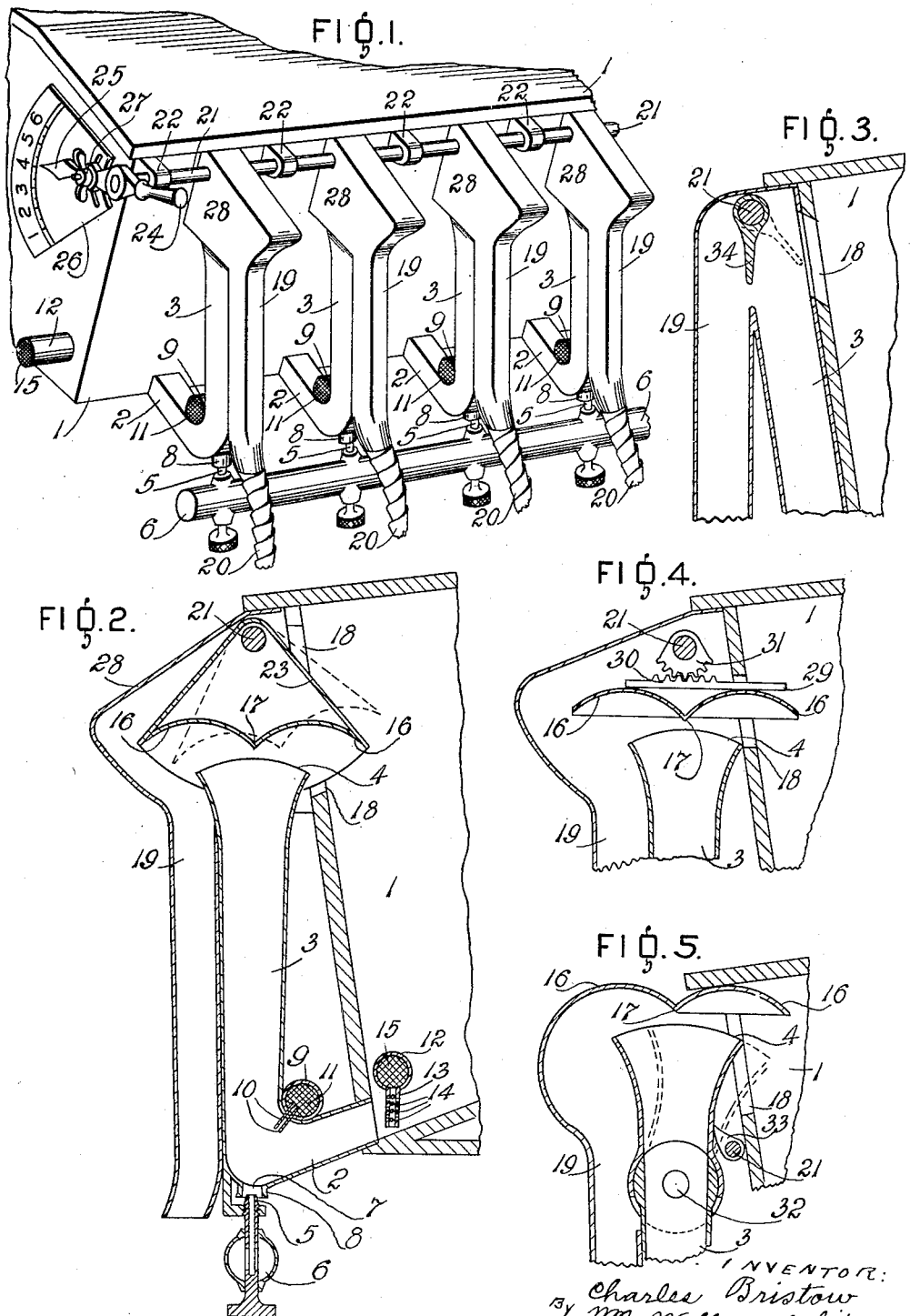

CHARLES BRISTOW, OF CHRISTCHURCH, NEW ZEALAND.

DRILL, BROADCASTER, AND OTHER SOWING IMPLEMENT.

1,330,838.   Specification of Letters Patent.   Patented Feb. 17, 1920.

Application filed April 23, 1919. Serial No. 292,057.

*To all whom it may concern:*

Be it known that I, CHARLES BRISTOW, a subject of the King of Great Britain, residing at 19 Stratford street, Fendalton, Christchurch, in the Dominion of New Zealand, have invented new and useful Improvements in and Relating to Drills, Broadcasters, and other Sowing Implements, of which the following is a specification.

This invention relates to drills, broadcasters and other implements for sowing seed, grain, manure and the like, and refers to that type in which pneumatic agency is employed for the purpose of feeding such material from the seed-box or hopper to the colters or other sowing means.

It is the object of the present invention to provide a feeding device capable of dealing with grain or seeds of any description and also with lime, chemical manures and other material in powdered form, such device including a means of regulation adapted to be simply and conveniently manipulated by the operator so as to cause such seed or other material to be sown in any desired quantity.

In carrying this object into effect the invention consists essentially of discharging by pneumatic agency a constant volume of seed or material and dividing such volume, as it issues, in such a manner as to deliver the desired quantity to the sowing means and return the balance to the hopper or to some other position from whence it may reënter the said discharge device. The invention includes also means of adjustment whereby the proportions of material sown and returned may be varied for the purpose of effecting the sowing in any desired quantity per acre.

In order that the nature of the invention may be clearly understood, it will now be explained with reference to the accompanying drawings which illustrate, by way of example, some practical methods of carrying the same into effect and in which:—

Figure 1.— is a perspective view showing a portion of the seed-box or hopper of a drill and illustrating an application of the invention thereto, Fig. 2.— is a cross-section showing upon a somewhat larger scale, a feeding-device similar in construction to that in Fig. 1 together with a portion of the hopper, and, Figs. 3, 4, and 5.— are similar views illustrating some alternative methods of providing the desired regulation.

Referring first to Figs. 1 and 2. 1 is the hopper of the usual kind as provided upon a drill, broadcaster, or other implement and adapted to contain the material it is desired to sow.

Connecting with the lower portion of the hopper 1 is the intake 2 of a pipe or duct 3 through which material, entering by gravity from the hopper 1 through the intake 2, is discharged in a constant volume by pneumatic means and issues from the mouth 4. In the case of a drill or other implement adapted to sow in rows, a plurality of these discharge tubes will be provided, preferably one for each of the colters or other planting means while in the case of a broadcaster or the like implement one or more discharge pipes of the desired capacity may be employed.

As here shown for the purpose of providing the pneumatic discharge, in the lower end of the pipe 2 is provided a nozzle 5 through which is delivered a jet of compressed air supplied by means of a pipe 6 from a compressor or other suitable source. As here shown the nozzle 5 is capable of height adjustment in relation to the pipe 3 and is adapted to deliver its air through a hole 7 surrounded by a petticoat 8. If desired however this adjustment may be dispensed with and a fixed nozzle substituted in which case such nozzle may be either introduced in the manner here shown or permanently secured to the pipe 3. In any case the nozzle may be of any desired form so as to avoid the danger of its becoming blocked with the seed or material, or suitable means may be provided in the pipe 3 for this purpose.

For the purpose of creating an induction which assists the action of the jet in discharging the material, communication is preferably provided between the interior of the pipe 3 and the atmosphere. As here shown this air admission is provided by means of a breather consisting of a short length of tubing 9 mounted horizontally upon the exterior of the pipe 3 and adapted to admit air to the interior of the latter between a pair of lips or directing-plates 10 arranged in the junction of the intake 2 with the pipe 3. The open ends of the tubes 9 are preferably protected with gauze or perforated converings 11. If found desirable however, additional openings may be provided in the lower portion of the pipe 3 or its intake.

In order to provide a means of agitating the material in the hopper for the purpose of maintaining a steady flow to the intakes 2 and to provide an air admission which is beneficial in assisting the travel of such seed to the pipe 3 a horizontal tube 12 is slidably mounted in the lower portion of the hopper and is adapted to be reciprocated by any suitable means operated by the carrying wheels of the implement. The said tube is provided with branches or T's 13, which project downward and are adapted, as the tube 12 is reciprocated, to pass back and forth in front of the mouths of the intakes 2, such branches being provided with perforations 14 or other formations whereby they may deliver the air from the tube 12. The ends of the pipe 12 which are open to the atmosphere are preferably protected with perforated or gauze coverings 15. If thought desirable however, the tube 12 instead of being in communication with the atmosphere, as above mentioned, may be closed at its ends and supplied with air under pressure which may be conveniently obtained from the compressed air system which supplies the pneumatic feeding devices.

The discharge pipe 3 and its intake 2 are preferably slightly tapered and as here shown in order that the material as it passes therethrough may be traveling in a gradually increasing area. The said pipe is also preferably somewhat flared at the discharge mouth 4 as here shown in order that the material as it issues may be distributed over a greater area and so be capable of being the more accurately divided by the means hereinafter described.

As here shown the means for dividing the issuing seed comprises a deflecting plate 16 mounted above the mouth 4. The intermediate portion of the said deflecting plate being formed with a downwardly projecting ridge or apex 17, while the portions on either side are suitably curved so as to direct the portion of the material which impinges the plate on one side of the apex, back into the hopper 1 through a suitable opening 18 and to similarly direct the remaining portion of the material, which impinges the plate upon the opposite side of the apex, into a spout 19 from whence it passes to the flexible grain tubes 20 or the like communicating with the colters or other sowing means. It has been found in practice that by arranging the apex or other means of division at a slight interval from the mouth 4, the tendency of some seeds and other material to cling to such apex and so block the discharge will be overcome.

It will be understood that if a constant volume of material is discharged through the pipe 3 and the deflecting plate is so arranged that its apex 17 will impinge the center of the issuing stream, half of such volume will be delivered to the sowing means and the other half returned to the hopper. Thus for example if the discharge through the pipe 3 is at a rate equivalent to the sowing of six bushels per acre, the actual result will be at the rate of three bushels per acre sown and three returned. By moving the plate so as to bring the apex nearer to the hopper, as for instance as indicated in dotted lines, the proportion of material directed to the spout 10 will be increased and the amount returned will be correspondingly diminished. Thus for example if with the plate in this position the actual sowing is at the rate of five bushels per acre, the amount returned to the hopper will be at the rate of one bushel per acre. Thus it will be understood that by adjusting the position of the plate 16 in relation to the mouth 4 any desired rate of sowing may be obtained.

As here shown this purpose is effected by providing a horizontal shaft 21 carried in suitable bearings 22 upon the hopper 1 and to which shaft each of the deflecting-plates 16 is attached as by means of a suitable quadrant or the like 23, the arrangement being such that by turning the shaft 21 a corresponding turning of all the deflecting-plates will be effected. For the purpose of enabling this adjustment to be conveniently performed so as to obtain a sowing of any desired quantity per acre, the shaft is provided with a suitable handle 24 or other means whereby it may be turned, and indicating means are also provided for enabling the required position of the shaft necessary to produce the desired rate of sowing to be ascertained. As here shown this is effected by providing the handle 24 with a pointer 25 adapted to indicate the various positions upon a quadrant or plate 26 mounted upon the hopper and graduated so as to read directly in bushels per acre, while to secure the shaft in place, when the setting has been made, the pointer is provided with a suitable locking screw 27.

To direct the material into the spout 19 and to exclude dirt and foreign matter such spout terminates at its upper end in a hood or casing 28 which serves to inclose the mouth 4 and the plate 16.

Referring now to the arrangement shown in Fig. 4, which illustrates an alternative method of providing the adjustment of the deflecting-plate so as to obtain the desired sowing. In this case the plate 16, similar in form to that of Fig. 2, is mounted by means of suitable guides 29 slidably carried in grooves provided in the side of the hopper so as to permit of such plate 16 being moved across the mouth 4 as required, while for the purpose of producing such movement a rack 30 is provided upon the said plate and adapted to intermesh with a pinion or segment 31 keyed upon the shaft 21.

If thought desirable however, the adjustment may manifestly be obtained by making the plate 16 stationary and moving the pipe 3 or the upper portion thereof in relation thereto. Thus as illustrated in Fig. 5, the pipe 3 is made in two portions connected by means of a joint whereby the upper portion containing the mouth may turn as on a pivot 32 and so vary the position of the mouth 4 in relation to the plate 16 which latter will in this case be stationary. For the purpose of enabling the required adjustment to be made a suitable cam 33 is keyed upon the shaft 21 and adapted to actuate the said upper portion of the pipe 3 in opposition to a suitable spring. As here shown the deflecting-plate 16 is integral with the spout 19 and may therefore be considered as a mouth or extension of the latter. It will be obvious also that the operation would be exactly the same if the pipe 3 were made rigid and the spout adjustable. The means for effecting the division of the issuing material may therefore include the mouth of the spout and the adjustment may be effected in any manner whereby the required variation of the positions of the mouth of the spout 19 and the mouth 4 of the discharge pipe in relation to one another may be obtained.

As shown in Fig. 3 the discharge tube 3 is arranged at an angle with the spout 19 while for the purpose of effecting the desired division of the material as it issues, a vane 34 is provided and keyed upon the shaft 21 so as to be capable of being turned in one direction or the other above the point of junction of the said pipe 3 with the spout.

As already mentioned however, the foregoing description is given by way of example and for the clear understanding of the invention. The specification must not therefore be construed in such a manner as to limit the invention to the actual construction herein described and illustrated, but the invention includes within its scope any suitable construction of feeding device embodying in combination the features of a pneumatic discharge adapted to deliver a constant volume of the material and means for dividing such volume of material, as it issues, in such a manner that the desired proportion is delivered to the sowing means while the balance is returned to a position from whence it may reënter the said pneumatic discharge.

I claim—

1. The combination with a sowing implement provided with a hopper and sowing appliances, of means for feeding material from the hopper to the sowing appliances and comprising a pneumatic discharge device adapted to deliver a constant volume of said material, and means for dividing said volume as it issues into two parts one of which is delivered to the sowing appliances while the other is delivered to a position from whence it may reënter said pneumatic discharge.

2. The combination with a sowing implement provided with a hopper and sowing appliances, of means for feeding material from the hopper to the sowing appliances and comprising a pneumatic discharge device adapted to deliver a constant volume of said material, means for dividing said volume as it issues into two parts one of which is delivered to the sowing appliances while the other is delivered to a position from whence it may reënter said pneumatic discharge, and means for adjusting the relative positions of said dividing means whereby the volume as it issues from the discharge device may be varied at the will of the operator.

3. The combination with a sowing implement provided with a hopper and sowing appliances, of a plurality of feeding devices each comprising a pneumatic discharge device adapted to deliver a constant volume of material, and means for dividing said volume as it issues into two parts one of which is delivered to the sowing appliances while the other is delivered to a position from whence it may reënter said pneumatic discharge, means for adjusting the positions of all of said dividing means whereby the respective volumes of material delivered may be varied, and means for indicating the adjustment of said last means.

4. The combination with a sowing implement provided with a hopper and sowing appliances, of means for pneumatically discharging material from said hopper to the sowing appliances, and means for agitating the material in the hopper thereby to facilitate the flow thereof and comprising a tube adapted to reciprocate within the hopper and provided with orifices adapted to discharge air into said material.

5. The combination with a sowing implement provided with a hopper and sowing appliances, of means for pneumatically discharging material from said hopper to the sowing appliances, and means for agitating the material in the hopper thereby to facilitate the flow thereof and comprising a tube adapted to reciprocate within the hopper and provided with a plurality of branches having orifices adapted to discharge air into said material.

6. The combination with a sowing implement provided with a hopper and sowing appliances, of means for pneumatically discharging material from said hopper to the sowing appliances, and means for agitating the material in the hopper thereby to facilitate the flow thereof and comprising a tube horizontally disposed within said hopper and adapted to reciprocate therein, said tube being provided with a plurality of branches having orifices adapted to discharge air into said material.

In testimony whereof I have signed my name to this specification.

CHARLES BRISTOW.

Witnesses:
 CYRIL CARLYM COATES,
 SIDNEY JAMES TRELEAVEN.